June 14, 1927.
H. E. BIRCH
1,632,755
MEANS FOR FASTENING HOISTING ROPE TO SKIP BUCKETS AND COUNTERWEIGHTS
Filed Feb. 20, 1926
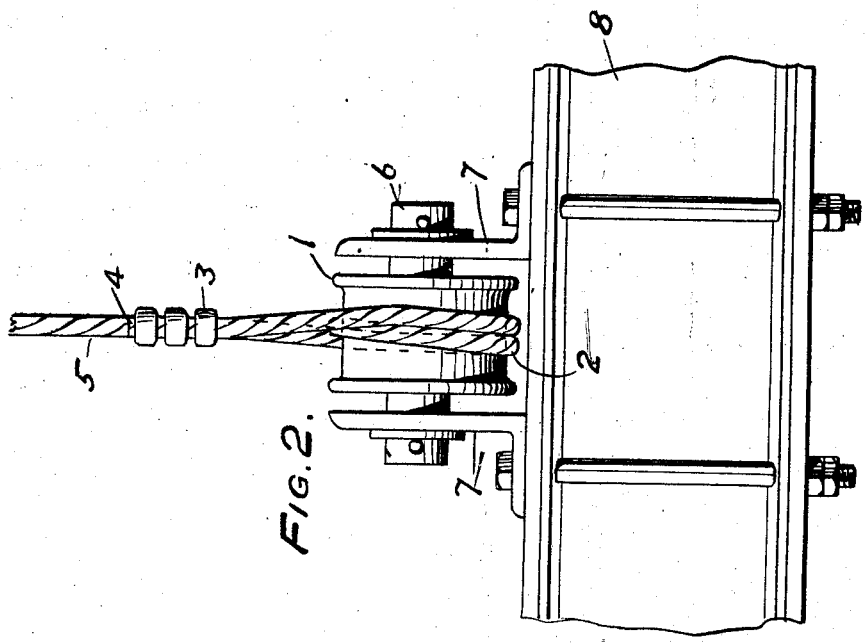
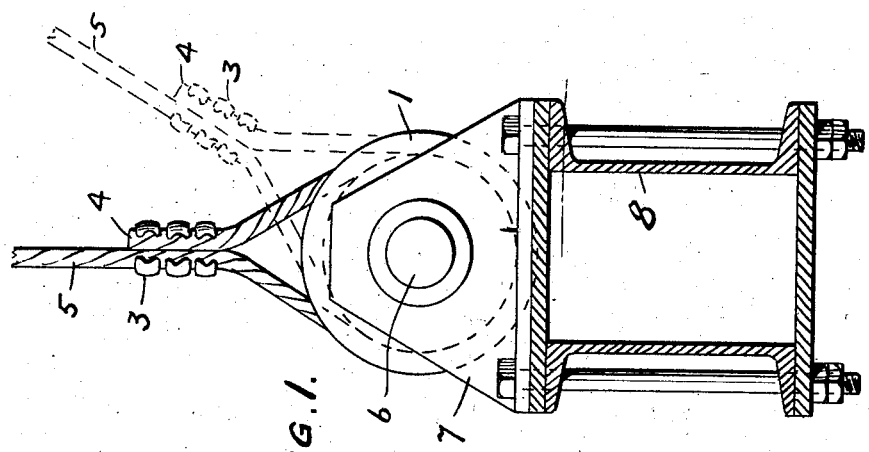
WITNESS:
INVENTOR
Herbert E. Birch
BY
Augustus B. Stoughton
ATTORNEY.

Patented June 14, 1927.

1,632,755

UNITED STATES PATENT OFFICE.

HERBERT E. BIRCH, OF PHILADELPHIA, PENNSYLVANIA, ASSIGNOR TO R. H. BEAUMONT CO., OF PHILADELPHIA, PENNSYLVANIA, A CORPORATION OF PENNSYLVANIA.

MEANS FOR FASTENING HOISTING ROPE TO SKIP BUCKETS AND COUNTERWEIGHTS.

Application filed February 20, 1926. Serial No. 89,544.

The principal objects of the present invention are to snub or check a slack rope in starting to hoist a bucket or load from a position of rest as at the bottom of a lift; to diminish the strain on the rope when starting to hoist load; to avoid injury to the rope when slack cable is taken up suddenly; to provide a simple, efficient, and reliable resilient connection between the cable and load; to avoid bending the cable when the load travels around bends; and to provide a simple take-up for adjusting the length of the cable.

Other objects of the invention will appear from the following description at the end of which the invention will be claimed.

However, generally stated, the invention may be said to consist of means for fastening hoisting cables to skip buckets and the like which comprise a spool wheel around which the end part of the rope is wrapped substantially 1¾ turns, devices for securing the end of the rope to the reach thereof, and a frame in which the spool wheel is turnably mounted and which is adapted for attachment to the skip bucket or the like.

The invention also comprises the improvements to be presently described and finally claimed.

In the following description reference will be made to the accompanying drawing forming part hereof and in which—

Figure 1 is an end view illustrating features of the invention, and

Fig. 2 is a side view of Fig. 1.

In the drawing 1 is a spool wheel around which the end part 2 of the rope or cable is wrapped substantially 1¾ turns or more. 3 are clips for securing the end 4 of the rope to the reach 5 thereof. 6 is a shaft on which the spool wheel 1 is mounted. 7 are angle structures in which the shaft 6 is carried and in respect to which the spool wheel or drum is revoluble and which are adapted for attachment to the skip bucket or counterweight, or more accurately, to the portion thereof indicated at 8. The parts 7 may be regarded as one form of frame.

If, for example, the bucket, counterweight or the like is resting on the ground or is otherwise supported at the bottom of the lift, and if the cable is slack, then in starting to hoist the load the turnable drum in cooperation with the oppositely directed turns of the cable around it snubs or checks the cable, diminishing the strain on it and avoiding injury to it, and this is true perhaps to a less extent even if the cable is not distinctly slack. When the load traverses curves, or when the line of draft is inclined to the line of travel, as shown in Fig. 1 by dotted lines, the cable or rope is not bent but the drum or wheel is turned. To take up the rope or shorten the cable the clips 3 may be removed and the end 4 of the cable moved further up the reach thereof, the turning of the drum facilitates this movement, and then the clips can be reapplied.

It will be obvious to those skilled in the art to which the invention relates that modifications may be made in details of construction and arrangement and in matters of mere form without departing from the spirit of the invention which is not limited to such matters or otherwise than as the prior art and the appended claims may require.

I claim:

1. Means for fastening hoisting rope to skip buckets and the like which comprise a circular spool wheel around which the end part of the rope is wrapped at least substantially 1¾ turns, devices for securing the end of the rope to the reach thereof, and a frame in which the spool wheel is turnably mounted and which is adapted for attachment to the skip bucket and the like.

2. Means for fastening hoisting rope to skip buckets and the like which comprise a circular spool wheel around which the end part of the rope is wrapped at least substantially 1¾ turns, clips for securing the end of the rope to the reach thereof, a shaft on which the spool wheel is mounted, and angle structures in which the shaft is carried and in respect to which the spool wheel is revoluble and which are adapted for attachment to the skip bucket or the like.

HERBERT E. BIRCH.